United States Patent [19] [11] 4,129,608
Murayama et al. [45] Dec. 12, 1978

[54] MULTI-COMPONENT GRAFT COPOLYMER AND THERMOPLASTIC RESIN COMPOSITION THEREOF

[75] Inventors: Naohiro Murayama; Kenichi Nakamura; Shunzo Endo, all of Iwaki, Japan

[73] Assignee: Kureha Kagaku Kogyo Kabushiki Kaisha, Tokyo, Japan

[21] Appl. No.: 767,022

[22] Filed: Feb. 9, 1977

[30] Foreign Application Priority Data

Mar. 9, 1976 [JP] Japan .................................. 51-24644
Sep. 7, 1976 [JP] Japan .................................. 51-106984
Nov. 30, 1976 [JP] Japan .................................. 51-143746

[51] Int. Cl.² ............................................. C08L 63/00
[52] U.S. Cl. .................................................. 260/836
[58] Field of Search ........ 260/836, 837 PV, 29.6 PM, 260/29.6 RB

[56] References Cited

U.S. PATENT DOCUMENTS

3,660,525  5/1972  Kawahara ............................. 260/836
3,957,903  5/1976  Doi et al. ............................. 260/836

Primary Examiner—Theodore E. Pertilla
Attorney, Agent, or Firm—Oblon, Fisher, Spivak, McClelland & Maier

[57] ABSTRACT

A muti-component graft copolymer comprises 50 to 80 wt. parts of an elastic component produced by an emulsion polymerization of 100 to 70 wt. % of a $C_{2-12}$ alkyl acrylate and 0 to 30 wt. % of a comonomer having a single vinyl or vinylidene group and 50 to 20 wt. parts of a graft polymerized component produced by a graft-polymerization of 5 to 90 wt. % of a vinyl monomer having glycidyl group and 95 to 10 wt. % of a lower alkyl methacrylate, a lower alkyl acrylate, styrene, α-methyl styrene, methacrylonitrile, or acrylonitrile on the elastic component.

A polymethyl methacrylate or polyvinyl chloride is blended to the multi-component graft copolymer.

8 Claims, No Drawings

MULTI-COMPONENT GRAFT COPOLYMER AND THERMOPLASTIC RESIN COMPOSITION THEREOF

BACKGROUND OF THE INVENTION

Field of the Invention

The present invention relates to a multi-component graft copolymer and a thermoplastic resin composition thereof which has excellent physical properties especially high weather durability and impact strength. More particularly, it relates to a multi-component graft copolymer and a polymethyl methacrylate composition thereof or a polyvinyl chloride composition thereof which has excellent impact strength and weather durability.

It is known that a brittle hard resin can be blended to a natural or synthetic rubber or that a monomer for hard resin can be graft-polymerized on an elastic polymer to prepare a transparent resin composition having high impact strength.

It is also known that the graft copolymer produced by a graft polymerization of the monomer on the elastic polymer or the composition of the graft copolymer and a hard resin have superior physical properties to those of the mixture of the elastic polymer and the hard resin because of superior mutual solubility of the elastic polymer and the base resin.

Usually, methyl methacrylate resin or a composition comprising a main component of methyl methacrylate has superior transparency, luster and weather durability to those of the other resins, and has excellent physical properties and shape-stability at high temperature. However, the resin has not enough impact strength and is brittle and the improvement of these properties has been desired.

It has been well-known that vinyl chloride resins have excellent physical and chemical properties and have been widely used in various fields. However, disadvantageously vinyl chloride resins have not enough impact strength. Various studies for improving the property has been conducted.

It has been known to improve the impact strength by blending a hard resin such as a polymethyl methacrylate or a polyvinyl chloride to MBS resin which is produced by a graft-polymerization of styrene and methyl methacrylate on a polybutadiene elastic polymer or ABS resin which is produced by a graft-polymerization of styrene and acrylonitrile on a polybutadiene elastic polymer.

However, the compositions of the hard resin and the MBS resin or ABS resin have inferior weather durability whereby the compositions could not be used outdoors. At the initial stage after the molding, the compositions have enough high impact strength. However, when the compositions are used outdoor, the high impact strength of the composition could not be maintained. The impact strength is rapidly lowered. The main reason of the lowering of the impact strength has been considered to be based on the deterioration of polybutadiene in the MBS resin or the ABS resin by ultraviolet rays.

It has been studied to use an elastic component other than polybutadiene having weather durability as the impact strength improver from the above-mentioned viewpoint.

Typical resins include a graft copolymer produced by a graft-polymerization of a monomer for hard resin on an elastic copolymer of ethylene and vinyl acetate or a graft copolymer produced by a graft-polymerization of a monomer of styrene, methyl methacrylate or acrylonitrile on an elastic core polymer of polyalkyl acrylate.

However, these impact strength improver could not impart enough impact strength increasing effect in comparison with those of the compositions of the hard resin and the MBS resin or the ABS resin. The physical properties of the hard resin such as tensile strength and heat deformation temperature may be sometimes remarkably lowered by the blend to certain graft copolymer.

The inventors have studied to improve the hard resin with a graft copolymer having an elastic core component of polyalkyl acrylate which has excellent weather durability.

SUMMARY OF THE INVENTION

It is an object of the present invention to provide a multi-component graft copolymer which has high impact strength and high weather durability.

Another object of the present invention is to provide a methyl methacrylate resin composition comprising a multi-component graft copolymer which has high impact strength and high weather durability.

The other object of the present invention is to provide a vinyl chloride resin composition comprising a multi-component graft copolymer which has high impact strength and high weather durability.

The multi-component graft copolymer of the invention can be produced by graft-polymerizing a vinyl monomer having a glycidyl group and a monomer for hard resin on an elastic component produced by emulsion polymerization of a monomer having as main component an alkyl acrylate, and then, separating the resulting latex by an acid precipitation or salting out, and drying it.

DETAILED DESCRIPTION OF THE PREFERRED EMBODIMENTS

The multi-component graft copolymers and the thermoplastic resin compositions thereof will be illustrated.

The elastic component as the core of the graft copolymer can be produced by an emulsion polymerization of an alkyl acrylate or a mixture of the alkyl acrylate and a comonomer having a single vinyl or vinylidene group if necessary with a small amount of a cross-linking agent by a conventional process.

The alkyl acrylate can be a $C_{2-12}$ alkyl acrylate which can have a straight chain or a branched chain.

Suitable alkyl acrylates include ethyl acrylate, n-propyl acrylate, n-butyl acrylate, n-hexyl acrylate, 2-ethyl hexyl acrylate and mixtures thereof. It is possible to substitute less than 30 wt.% of the alkyl acrylate with a comonomer thereof.

Suitable comonomers which can be copolymerized with the alkyl acrylate, include aromatic vinyl monomers such as styrene, α-methyl styrene; alkyl methacrylates such as methyl methacrylate, ethyl methacrylate; unsaturated nitriles such as acrylonitrile, methacrylonitrile; vinyl ethers such as methyl vinyl ether, butyl vinyl ether; vinyl halides such as vinyl chloride, vinyl bromide; vinylidene halides such as vinylidene chloride, vinylidene bromide; vinyl monomers having glycidyl group such as glycidyl acrylate, glycidyl methacrylate, allyl glycidyl ether, ethyleneglycol diglycidyl ether.

The crosslinking agent should be copolymerizable with the alkyl acrylate and the vinyl monomer or the vinylidene monomer.

Suitable crosslinking agents include aromatic polyfunctional vinyl compounds such as divinyl benzene, divinyl toluene; polyalcohols such as ethyleneglycol dimethacrylate, 1,3-butanediol diacrylate, trimethacrylic acid esters, triacrylic acid esters; allyl esters such as allyl acrylate, allyl methacrylate; di- and tri-allyl compounds such as diallyl phthalate, diallyl sebacate, triallyl triazine, etc.

The amount of the crosslinking agent is depending upon the type of the monomers and is usually in a range of 0 to 3 wt.% preferably 0.01 to 3 wt.% to total amount of the monomers.

When the amount of the crosslinking agent is suitable, the impact strength of the graft copolymer is improved. However, when it is more than 3 wt.%, the impact strength of the graft copolymer may be lowered.

The size of the particles of the elastic component obtained by the emulsion polymerization can be controlled as desired depending upon the types and amounts of the emulsifier and the catalyst and the polymerization temperature. Usually, the latex particles of the elastic component have an average diameter of 0.05 to 0.2μ.

The following graft polymerization is carried out by using the resulting elastic component.

The latex which is produced by the above-mentioned process can be used with or without microagglomeration, in the graft polymerization. The latex can be microagglomerated to obtain the elastic component having an average particle size of 0.12 to 1μ. The microagglomeration can be carried out by using a mineral acid such as hydrochloric acid and sulfuric acid; an inorganic salt or an organic salt or an organic acid anhydride which are usually used as the latex microagglemerating agent.

When the microagglomeration of the latex is carried out, the effect for improving the impact strength of the graft copolymer is improved and the fluctuation of the impact strength of the composition caused by a degree of blending, can be lowered to impart stable and high impact strength of the composition of the graft copolymer.

The monomers used for the graft polymerization on the elastic component of the alkyl acrylate latex, will be illustrated in detail.

The vinyl monomers having a glycidyl group which are important components in the process of the invention can be glycidyl methacrylate, glycidyl acrylate, aryl glycidyl ethers, ethyleneglycol glycidyl ethers, etc.

The monomer mixture for the graft polymerization comprises 5 to 90 wt.% of the vinyl monomer having glycidyl group and 95 to 10 wt.% of a comonomer which is mainly selected from the group consisting of methacrylates such as methyl methacrylate, ethyl methacrylate, propyl methacrylate; acrylates such as methyl acrylate, ethyl acrylate; styrene, halogenated styrenes, alkyl styrenes such as α-methyl styrene, acrylonitrile, and methacrylonitrile.

A part of the comonomer can be substituted by the abovementioned crosslinking agent, if desired. When the crosslinking agent is used in the graft polymerization, the amount of the crosslinking agent should be less than 3 wt.%.

In the graft polymerization, the monomers can be added at once and can be also added sequentially at two or more times to carry out the graft polymerization stepwise. In accordance with the stepwise graft polymerization, the outer layer of the graft copolymer can be formed with a component which has high mutual solubility with the thermoplastic resin blended to the graft copolymer.

When the resulting multi-component graft copolymer of the invention which is produced by using a vinyl monomer having glycidyl group as the monomer in the graft polymerization, is blended to the other thermoplastic resin, the impact strength of the composition is remarkably improved, the impact strength of the composition is almost independent of the roll mill conditions, the weather durability is excellent and whitening is a difficulty caused by high stress.

It is especially preferable to blend 5 to 50 wt. parts of the multi-component graft copolymer to 95 to 50 wt. parts of methyl methacrylate resin to obtain a resin composition having excellent impact strength and weather durability.

It is also preferable to blend 3 to 40 wt. parts of the multi-component graft copolymer to 97 to 60 wt. parts of vinyl chloride resin to obtain a resin composition having excellent impact strength and weather durability.

It is also possible to blend the multi-component graft copolymer to a thermoplastic resin which is compatible with it, for example, polyvinylidene fluoride, polyacrylonitrile, polystyrene and acrylonitrile-styrene copolymer.

The invention will be further illustrated by certain examples wherein the term of "part" designates "part by weight".

EXAMPLE 1

In an autoclave equipped with a stirrer, the following components were charged and the reaction was carried out at 45° C. for 16 hours to complete the polymerization. The conversion was about 100%.

| Crosslinked elastic core copolymer | | |
|---|---|---|
| n-Butyl acrylate | 65 | parts |
| Ethyleneglycol dimethacrylate | 0.2 | part |
| Diisopropylbenzenehydroperoxide | 0.195 | part |
| Ferrous sulfate ($F_2SO_4 \cdot 7H_2O$) | 0.002 | part |
| Disodium ethylenediamine tetraacetate | 0.003 | part |
| Formaldehyde sodium sulfoxylate | 0.049 | part |
| Potassium oleate | 0.9 | part |
| Sodium pyrophosphate | 0.1 | part |
| Distilled water | 175 | parts |

The resulting latex was stabilized by adding 0.035 part of sodium sulfosuccinate dioctyl ester and then, 60 cc of 2% tartaric acid aqueous solution and 36 cc of 2% sodium hydroxide aqueous solution were gradually added to the latex to microagglomerate the latex in pH of 7 to 9.

The following first step grafting components were added to the latex and the polymerization was continued at 45° C. for 16 hours. The conversion was about 100%.

The following second step grafting components were added to the resulting grafted latex and the polymerization was continued at 45° C. for 16 hours. The conversion was about 100%.

| First step grafting components | | |
|---|---|---|
| Methyl methacrylate | 17 | parts |
| Glycidyl methacrylate | 3 | parts |

-continued

| | | |
|---|---|---|
| Ethyleneglycol dimethacrylate | 0.12 | part |
| Diisopropylbenzene hydroperoxide | 0.02 | part |
| Formaldehyde sodium sulfoxylate | 0.01 | part |
| Sodium sulfosuccinate dioctyl ester | 0.03 | part |
| Second step grafting components | | |
| Methyl methacrylate | 15 | parts |
| Ethyleneglycol dimethacrylate | 0.1 | part |
| Diisopropylbenzene hydroperoxide | 0.015 | part |

The resulting latex was coagulated by salting out with an aqueous solution of sodium chloride and was filtered and washed with water and dried as the post-treatment, to obtain the multi-component graft polymer.

30 parts of the multi-component graft polymer was blended to 70 parts of methyl methacrylate resin (Sumipex B-MH manufactured by Sumitomo Kagaku K.K.) at 190° C. for 5 minutes by a roll mill and the mixture was preheated at 200° C. for 3 minutes and press-molded for 2 minutes to obtain a molded product having a Charpy impact strength of 4.3 Kg.cm/cm² (measured by Japanese Industrial Standard K 7111).

As a reference, when the process was repeated except polymerizing 20 parts of methyl methacrylate without glycidyl methacrylate in the first grafting step, the molded product had a Charpy impact strength of 2.5 Kg.cm/cm².

The methyl methacrylate resin used in the blending had a Charpy impact strength of 1.9 Kg.cm/cm².

When 10 parts of the multi-component graft polymer was blended to 90 parts of vinyl chloride resin (degree of polymerization of 1000) and 2.0 parts of the tin type stabilizer(dibutyl-tin maleate) at 170° C. for 3 minutes by a roll mill, and the mixture was preheated at 200° C. for 3 minutes and was press-molded for 2 minutes a molded product having a Charpy impact strength of 99 Kg.cm/cm² was obtained.

As a reference, when the process was repeated except that glycidyl methacrylate was not added, the molded product had a Charpy impact strength of 67 Kg.cm/cm².

The vinyl chloride resin used had a Charpy impact strength of 6 Kg.cm/cm².

30 parts of the multi-component graft polymer was blended to 70 parts of vinylidenefluoride resin (degree of polymerization of 1000) at 175° C. for 3 minutes by a roll mill and the mixture was preheated at 200° C. for 3 minutes and was press-molded for 2 minutes to obtain a molded product having an Izod impact strength of 100 Kg.cm/cm² (measured by ASTM-D256).

As a reference, when the process was repeated except that glycidyl methacrylate was not added, the molded product had an Izod impact strength of 55 Kg.cm/cm².

The vinylidene fluoride resin used had an Izod impact strength of 10 Kg.cm/cm².

EXAMPLE 2

Each multi-component graft polymer was produced by varying the ratio of glycidyl methacrylate, styrene and methyl methacrylate used in the graft polymerization on the elastic n-butyl acrylate polymer.

The monomer compositions of the multi-component graft polymers and the Charpy impact strength of the mixture of 30 parts of the multi-component graft polymer and 70 parts of methyl methacrylate resin, are shown in Table 1.

Table 1

| | Multi-component graft polymer | | | | | | | |
|---|---|---|---|---|---|---|---|---|
| | Elastic core polymer | | First step grafting components | | | | Second step grafting components | | Charpy impact strength (Kg.cm/cm²) |
| | BA | 1,3-BD | GMA | MMA | ST | EDMA | MMA | EDMA | |
| Example A | 65 | 0.2 | 6 | 10 | 4 | 0.12 | 15 | 0.1 | 7.1 |
| Example B | 65 | 0.2 | 6 | 6 | 8 | 0.12 | 15 | 0.1 | 7.3 |
| Example C | 65 | 0.2 | 6 | 0 | 14 | 0.12 | 15 | 0.1 | 6.1 |
| Reference D | 65 | 0.2 | 0 | 12 | 8 | 0.12 | 15 | 0.1 | 3.5 |
| Reference E | 65 | 0.2 | 0 | 0 | 20 | 0.12 | 15 | 0.1 | 3 |

Note: The process of the polymerizations for producing the multicomponent graft polymers and the method of measuring the physical properties of the compositions of the methyl methacrylate resin were the same with those of Example 1.
1,3-BD: 1,3-butanediol diacrylate
EDMA: ethyleneglycol dimethacrylate
BA: n-butyl acrylate
GMA: glycidyl methacrylate
MMA: methyl methacrylate
ST: styrene

EXAMPLE 3

Each multi-component graft polymer was produced by varying the ratios of the components shown in Table 2 in accordance with the process of Example 1.

Table 2

| | Elastic core polymer components | | | | Grafting components | | |
|---|---|---|---|---|---|---|---|
| | BA | ST | EDMA | 1,3-B.D. | GMA | MMA | EDMA |
| Example A' | 55.9 | 9.1 | 0.35 | 0 | 7 | 28 | 0.22 |
| Reference B' | 55.9 | 9.1 | 0.35 | 0 | 0 | 35 | 0.22 |
| Example C' | 55.9 | 9.1 | 0 | 0.35 | 7 | 28 | 0.22 |
| Reference D' | 55.9 | 9.1 | 0 | 0.35 | 0 | 35 | 0.22 |

The Charpy impact strengths of the molded products of the mixture of 30 parts of the multi-component graft polymer and 70 parts of methyl methacrylate resin blended at 190° C. for the time stated in Table 3 by a roll mill, are shown in Table 3.

Table 3

| Blending time | 1 min. 40 sec. (Kg.cm/cm²) | 3 min. | 6 min. | 10 min. |
|---|---|---|---|---|
| Example A' | 5.4 | 5.8 | 5.8 | 5.4 |
| Reference B' | 5.3 | 4.0 | 3.8 | 3.4 |
| Example C' | 5.2 | 5.8 | 5.8 | 5.5 |
| Reference D' | 4.5 | 5.1 | 4.9 | 3.8 |

Accelerated exposure tests for the samples of Example A' (3 min.) and Reference B'(3 min.) were carried out with a Weather meter (WE-SUN-HC type manufactured by Toyo Rika K.K.). The results are shown in Table 4.

Table 4

| | Charpy impact strength maintaining ratio (%) | | | | | |
|---|---|---|---|---|---|---|
| Exposing time | 0 | 200 hr. | 400 hr. | 600 hr. | 800 hr. | 1000 hr. |
| Exp. A' | 100 | 107 | 110 | 114 | 110 | 102 |
| Ref. B' | 100 | 94 | 64 | 58 | 54 | 52 |

EXAMPLE 4

Each multi-component graft polymer was produced by varying the ratio of glycidyl methacrylate to methyl methacrylate used in the graft polymerization on the crosslinked elastic alkyl acrylate polymer.

The monomer compositions of the multi-component graft polymers and the Charpy impact strength of the mixtures of 30 parts of the multi-component graft polymer and 70 parts of methyl methacrylate resin are shown in Table 5.

Table 5

| | Multi-component graft polymer components (wt. parts) | | | | | Charpy impact strength (Kg.cm/cm²) |
|---|---|---|---|---|---|---|
| | Elastic core polymer | | First step grafting components | | Second step grafting components | |
| | BA | ST | GMA | MMA | MMA | |
| Ref. A" | 65 | 0 | 0 | 20 | 15 | 2.5 |
| Exp. B" | 65 | 0 | 3.0 | 17.0 | 15 | 4.3 |
| Exp. C" | 65 | 0 | 14.2 | 5.8 | 15 | 5.2 |
| Exp. D" | 65 | 0 | 19.6 | 0.4 | 15 | 3.5 |
| Ref. E" | 55.9 | 9.1 | 0 | 35 | 0 | 3.5 |
| Exp. F" | 55.9 | 9.1 | 3.5 | 31.5 | 0 | 4.8 |
| Exp. G" | 55.9 | 9.1 | 7.0 | 28.0 | 0 | 5.2 |
| Exp. H" | 55.9 | 9.1 | 17.5 | 17.5 | 0 | 5.5 |
| Exp. I" | 55.9 | 9.1 | 2.0 | 18.0 | 15 | 4.6 |
| Exp. J" | 55.9 | 9.1 | 6.0 | 14.0 | 15 | 7.1 |
| Exp. K" | 55.9 | 9.1 | 10.0 | 10.0 | 15 | 6.1 |
| Exp. L" | 55.9 | 9.1 | 14.2 | 5.8 | 15 | 5.8 |
| Exp. M" | 55.9 | 9.1 | 19.6 | 0.4 | 15 | 4.9 |

Note: The process of the polymerizations for producing the multicomponent graft polymers (type and amount of the crosslinking agents) and the method of measuring the physical properties of the compositions of the methyl methacrylate resin were the same with those of Example 1.

EXAMPLE 5

In accordance with the process of Example 4 (Example J") except using 6.0 parts of glycidyl acrylate instead of 6.0 parts of glycidyl methacrylate in the first step grafting components, the multi-component graft polymer was produced and the Charpy impact strength of the molded product of the mixture was measured to give 6.5 Kg.cm/cm².

EXAMPLE 6

In an autoclave equipped with a stirrer, the following components were charged and the reaction was carried out at 45° C. for 16 hours to complete the polymerization.

The conversion was about 100%.

| Crosslinked elastic core copolymer | | |
|---|---|---|
| n-Butyl acrylate | 65 | parts |
| Ethyleneglycol dimethacrylate | 0.2 | part |
| Diisopropylbenzene hydroperoxide | 0.195 | part |
| Ferrous sulfate (FeSO₄ . 7H₂O) | 0.002 | part |
| Disodium ethylenediamine tetraacetate | 0.003 | part |
| Formaldehyde sodium sulfoxylate | 0.049 | part |
| Potassium oleate | 0.9 | part |
| Sodium pyrophosphate | 0.1 | part |
| Distilled water | 175 | parts |

The resulting latex was stabilized by adding 0.035 part of sodium sulfosuccinate dioctyl ester and then, 50 parts of 0.2% hydrochloride aqueous solution was gradually added to the latex to microagglomerate it and the pH of the latex was converted to 7.0 by adding an aqueous solution of sodium hydroxide.

The following first step grafting components were added to the latex and the polymerization was continued at 60° C. for 4 hours. The conversion was about 99%.

The following second step grafting components were added to the resulting grafted latex and the polymerization was continued at 60° C. for 7 hours.

| First step grafting components | | |
|---|---|---|
| Styrene | 10 | parts |
| Methyl methacrylate | 5 | parts |
| Glycidyl methacrylate | 5 | parts |
| Ethyleneglycol dimethacrylate | 0.152 | part |
| Diisopropylbenzene hydroperoxide | 0.02 | part |
| Formaldehyde sodium sulfoxylate | 0.01 | part |
| Sodium sulfosuccinate dioctyl ester | 0.03 | part |
| Second step grafting components | | |
| Methyl methacrylate | 15 | parts |
| Ethyleneglycol dimethacrylate | 0.114 | part |
| Diisopropylbenzene hydroperoxide | 0.015 | part |
| Formaldehyde sodium sulfoxylate | 0.005 | part |

The resulting latex contained about 30% of a solid content to show that the polymerization was substantially completed.

The resulting latex was coagulated by salting out with an aqueous solution of sodium chloride and was filtered and washed with water and dried as the post-treatment, to obtain powdery multi-component graft polymer.

10 parts of the multi-component graft polymer was blended to 90 parts of vinyl chloride resin (degree of polymerization of 1000) and lead type stabilizer (2.0 parts of lead trisulfate, 0.5 part of lead distearate, 1.0 part of lead stearate, 0.5 part of calcium stearate and 0.3 part of stearic acid) for 3 minutes by a roll mill at 170° C. The behavior of the resins around the roll was good and gave excellent processability. The mixture was press-molded at a press temperature of 200° C. under the pressure of 150 Kg/cm² to obtain a pressed sheet having a thickness of 3mm which had a Charpy impact strength of 89 Kg.cm/cm².

When the process was repeated except that 15 parts of styrene and 5 parts of glycidyl methacrylate were used as the first step grafting components, the pressed sheet had a Charpy impact strength of 66 Kg.cm/cm$^2$.

As a reference, when the process was repeated except that glycidyl methacrylate was not added and 15 parts of styrene and 5 parts of methyl methacrylate were graft-polymerized, the pressed sheet had a Charpy impact strength of 17 Kg.cm/cm$^2$.

The vinyl chloride resin used had a Charpy impact strength of 6 Kg.cm/cm$^2$. The impact strengths of the products of the invention were remarkably high.

EXAMPLE 7

Each multi-component graft polymer was produced by varying the ratios of the components as shown in Table 6 in accordance with the process of Example 6.

Table 6

| | Elastic core polymer components | | | | Grafting components | | |
|---|---|---|---|---|---|---|---|
| | BA | ST | EDMA | 1,3 B.D. | GMA | MMA | EDMA |
| Exp. A''' | 55.9 | 9.1 | 0.35 | 0 | 7 | 28 | 0.22 |
| Ref. B''' | 55.9 | 9.1 | 0.35 | 0 | 0 | 35 | 0.22 |
| Exp. C''' | 55.9 | 9.1 | 0 | 0.35 | 7 | 28 | 0.22 |
| Ref. D''' | 55.9 | 9.1 | 0 | 0.35 | 0 | 35 | 0.22 |

10 parts of the resulting multi-component graft polymer was blended to 90 parts of vinyl chloride resin (degree of polymerization of 1000) and 2.0 parts of a tin-type stabilizer (dibutyl-tin maleate) at 180° C. for the time stated in Table 9 by a roll mill. The Charpy impact strengths of the molded products of the mixtures are shown in Table 7.

Table 7

| | 1 min. 40 sec. (Kg.cm/cm$^2$) | 3 min. (Kg.cm/cm$^2$) | 6 min. (Kg.cm/cm$^2$) | 10 min. (Kg.cm/cm$^2$) |
|---|---|---|---|---|
| Exp. A''' | 153 | 154 | 148 | 151 |
| Ref. B''' | 122 | 128 | 124 | 112 |
| Exp. C''' | 149 | 150 | 152 | 149 |
| Ref. D''' | 119 | 121 | 113 | 104 |

Accelerated exposure tests for the samples of Example A'''(3 min.) and Reference B'''(3 min.) were carried out with a Weather meter(WE-SUN-HC type manufactured by Toyo Rika K. K.)

The results are shown in Table 8.

Table 8

| Exposing time | Charpy impact strength maintaining ratio (%) | | | |
|---|---|---|---|---|
| | 0 | 200 hr. | 600 hr. | 1000 hr. |
| Exp. A''' | 100 | 103 | 98 | 95 |
| Ref. B''' | 100 | 95 | 75 | 63 |

EXAMPLE 8

Each multi-component graft polymer was produced by varying the ratio of glycidyl methacrylate to methyl methacrylate used in the graft polymerization on the crosslinked elastic alkyl acrylate polymer.

The monomer compositions of the multi-component graft polymers and the Charpy impact strength of the mixtures of 10 parts of the multi-component graft polymer and 90 parts of vinyl chloride resin are shown in Table 9.

The process of the polymerizations for producing the multi-component graft polymers (the type and amount of crosslinking agent), the degree of polymerization of the vinyl chloride resin, the type and amount of the stabilizer and the method of measuring the physical properties of the vinyl chloride resin were the same with those of Example 5.

Table 9

| | Multi-component graft polymer (wt.part) | | | | | Charpy impact strength (Kg.cm/cm$^2$) |
|---|---|---|---|---|---|---|
| | Elastic core polymer | | First step grafting components | | Second step grafting components | |
| | BA | ST | GMA | MMA | MMA | |
| Ref. A'''' | 65 | 0 | 0 | 20 | 15 | 14 |
| Exp. B'''' | 65 | 0 | 3 | 17 | 15 | 53 |
| Exp. C'''' | 65 | 0 | 14.2 | 5.8 | 15 | 76 |
| Exp. D'''' | 65 | 0 | 19.6 | 0.4 | 15 | 68 |
| Ref. E'''' | 55.9 | 9.1 | 0 | 35 | 0 | 16 |
| Exp. F'''' | 55.9 | 9.1 | 6 | 14 | 15 | 87 |
| Exp. G'''' | 55.9 | 9.1 | 10 | 10 | 15 | 95 |

EXAMPLE 9

In accordance with the process of Example 9 (Example F'''') except using 6 parts of glycidyl acrylate instead of 6.0 parts of glycidyl methacrylate in the first step grafting components, the multi-component graft polymer was produced and the Charpy impact strength of the molded product of the mixture was measured to give 82 Kg.cm/cm$^2$.

EXAMPLE 10

In an autoclave equipped with a stirrer, the following components were charged and the reaction was carried out at 45° C. for 16 hours to complete the polymerization.

The conversion was about 100%.

| Crosslinked elastic core copolymer | | |
|---|---|---|
| n-Butyl acrylate | 65 | parts |
| Ethyleneglycol dimethacrylate | 0.2 | part |
| Diisopropylbenzene hydroperoxide | 0.195 | part |
| Ferrous sulfate (FeSO$_4$ . 7H$_2$O) | 0.002 | part |
| Disodium ethylenediamine tetraacetate | 0.003 | part |
| Formaldehyde sodium sulfoxylate | 0.049 | part |
| Potassium oleate | 0.9 | part |
| Sodium pyrophosphate | 0.1 | part |
| Distilled water | 175 | parts |

The resulting latex was stabilized by adding 0.035 part of sodium sulfosuccinate dioctyl ester and then, 50 parts of 0.2 hydrochloride aqueous solution was gradually added to the latex to microagglomerate it and the pH of the latex was converted to 7.0 by adding an aqueous solution of sodium hydroxide.

The following first step grafting components were added to the latex and the polymerization was continued at 60° C. for 4 hours.

The conversion was about 99%.

The following second step grafting components were added to the resulting grafted latex and the polymerization was continued at 60° C. for 7 hours.

| First step grafting components | | |
|---|---|---|
| Styrene | 11.3 | parts |
| Acrylonitrile | 3.7 | parts |
| Glycidyl methacrylate | 5 | parts |
| Ethyleneglycol dimethacrylate | 0.152 | part |

| -continued | | |
|---|---|---|
| Diisopropylbenzene hydroperoxide | 0.02 | part |
| Formaldehyde sodium sulfoxylate | 0.01 | part |
| Sodium succinate octyl ester | 0.03 | part |
| Second step grafting components | | |
| Styrene | 11.3 | parts |
| Acrylonitrile | 3.7 | parts |
| Ethyleneglycol dimethacrylate | 0.114 | part |
| Diisopropylbenzene hydroperoxide | 0.015 | part |
| Formaldehyde sodium sulfoxylate | 0.005 | part |

The resulting latex contained about 30% of a solid content to show that the polymerization was substantially completed.

The resulting latex was coagulated by salting out with an aqueous solution of sodium chloride and was filtered and washed with water and dried as the post-treatment to obtain powdery multi-component graft polymer.

20 parts of the multi-component graft polymer was blended to 80 parts of acrylonitrile-styrene copolymer (AN/ST=25/75) for 3 minutes by a roll mill at 170° C. The mixture was press-molded at a press temperature of 200° C. under the pressure of 150 Kg/cm² to obtain a pressed sheet having a thickness of 3 mm which had a Charpy impact strength of 27 Kg.cm/cm².

As a reference, when the process was repeated except that glycidyl methacrylate was not added and 15 parts of styrene and 5 parts of acrylonitrile were graft-polymerized, the pressed sheet had a Charpy impact strength of 15 Kg.cm/cm².

The AN-ST copolymer used had a Charpy impact strength of 2.3 Kg/cm². The impact strengths of the products of the invention were remarkably high.

What is claimed is:

1. A multi-component graft copolymer which comprises 50 to 80 wt. parts of an elastic component produced by an emulsion polymerization of 100 to 70 wt.% of a $C_{2-12}$ alkyl acrylate and 0 to 30 wt.% of a comonomer having a single vinyl or vinylidene group and 50 to 20 wt. parts of a graft polymerized component produced by a graft-polymerization of 5 to 90 wt.% of a vinyl monomer having a glycidyl group and 95 to 10 wt.% of a lower alkyl acrylate, styrene, α-methyl styrene, methacrylonitrile, or acrylonitrile on the elastic component.

2. A multi-component graft copolymer according to claim 1, wherein less than 3 wt.% of a crosslinking agent is added in the production of the graft polymerized component.

3. A multi-component graft copolymer according to claim 1, wherein less than 3 wt.% of a crosslinking agent is added in the production of the elastic component.

4. A multi-component graft copolymer according to claim 1, wherein the graft polymerized component formed on the elastic component is produced by a graft-polymerization of 5 to 90 wt.% of a vinyl monomer having a glycidyl group and 95 to 10 wt.% of methyl methacrylate or a mixture of methyl methacrylate as the main component and a comonomer.

5. A multi-component graft copolymer according to claim 1, wherein the graft polymerized component formed on the elastic component is produced by a graft-polymerization of 5 to 90 wt.% of a vinyl monomer having a glycidyl group and 95 to 10 wt.% of a lower alkyl methacrylate, a lower alkyl acrylate or styrene.

6. A polymer composition obtained by blending 5 to 50 wt parts of the graft copolymer of claim 4 with 95 to 50 parts of polymethyl methacrylate or a copolymer of more than 70 wt % of methyl methacrylate and a comonomer.

7. A polymer composition obtained by blending 3 to 40 wt parts of the graft copolymer of claim 5 with 97 to 60 wt parts of vinyl chloride resin.

8. A polymer composition according to claim 7 wherein said graft copolymer is produced by graft polymerizing 5 to 90% of a vinyl monomer having a glycidyl group and 95 to 10 wt % of methyl methacrylate.

* * * * *